US012634204B2

(12) United States Patent
Wang et al.

(10) Patent No.: US 12,634,204 B2
(45) Date of Patent: May 19, 2026

(54) METHOD, SYSTEM AND APPARATUS FOR NETWORK DEVICE MANAGEMENT

(71) Applicant: New H3C Technologies Co., Ltd., Hangzhou (CN)

(72) Inventors: Minghui Wang, Beijing (CN); Jianyong Song, Beijing (CN); Shugang Cheng, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 18/714,721

(22) PCT Filed: Mar. 4, 2022

(86) PCT No.: PCT/CN2022/079203
§ 371 (c)(1),
(2) Date: May 30, 2024

(87) PCT Pub. No.: WO2023/164916
PCT Pub. Date: Sep. 7, 2023

(65) Prior Publication Data
US 2025/0047563 A1 Feb. 6, 2025

(51) Int. Cl.
*H04L 41/14* (2022.01)
*H04L 41/16* (2022.01)

(52) U.S. Cl.
CPC .............. *H04L 41/14* (2013.01); *H04L 41/16* (2013.01)

(58) Field of Classification Search
CPC ................................ H04L 41/14; H04L 43/00
See application file for complete search history.

(56) References Cited

U.S. PATENT DOCUMENTS 10,470,059 B1 * 11/2019 Annambhotla ....... H04W 4/021
2003/0126195 A1 7/2003 Reynolds et al.
(Continued)

FOREIGN PATENT DOCUMENTS

CN 1731740 2/2006
CN 102916990 2/2013
(Continued)

OTHER PUBLICATIONS

Extended European Search Report issued in corresponding European Application No. 22929364.2, dated Dec. 9, 2024.
(Continued)

*Primary Examiner* — Esther B. Henderson
(74) *Attorney, Agent, or Firm* — NORTON ROSE FULBRIGHT US LLP

(57) ABSTRACT

A network device management method, system and apparatus relate to the technical field of network device, which are applied to a management application deployed on a network device, the management application is to manage the network device, the network device application is to realize a network communication function of the network device. The method includes: sending a data acquisition command to the network device application, so that the network device application sends a data response to the management application in response to the data acquisition command, wherein the network device application and the management application run on the same processing chip in the network device, and the data response includes data requested by the data acquisition command; processing the data included in the data response to obtain a processing result; implementing network device management based on the processing result. The technical solution provided by examples of the present disclosure may make full use of the
(Continued)

computing resources of the network device itself, so as to improve the efficiency of network device management.

9 Claims, 4 Drawing Sheets

(56)  References Cited

U.S. PATENT DOCUMENTS

| | | | |
|---|---|---|---|
| 2020/0374334 A1 | 11/2020 | Shakir et al. | |
| 2021/0144097 A1 | 5/2021 | Li et al. | |
| 2024/0144181 A1* | 5/2024 | Cella | G05B 19/4155 |

FOREIGN PATENT DOCUMENTS

| | | |
|---|---|---|
| CN | 107579898 | 1/2018 |
| CN | 111324572 | 6/2020 |
| CN | 112054862 | 12/2020 |
| CN | 113132127 | 7/2021 |
| CN | 113612688 | 11/2021 |
| JP | 2011114391 | 6/2011 |
| JP | 2017152956 | 8/2017 |
| KR | 20200048427 | 5/2020 |
| KR | 20210051917 | 5/2021 |
| WO | WO 2021/147368 | 7/2021 |
| WO | WO 2021/155260 | 8/2021 |

OTHER PUBLICATIONS

International Search Report and Written Opinion issued in Corresponding PCT Application No. PCT/CN2022/079203, dated Dec. 8, 2022 (English Translation provided).
Office Action issued in corresponding Singaporean Application No. 11202403712P, dated Dec. 23, 2025.

* cited by examiner

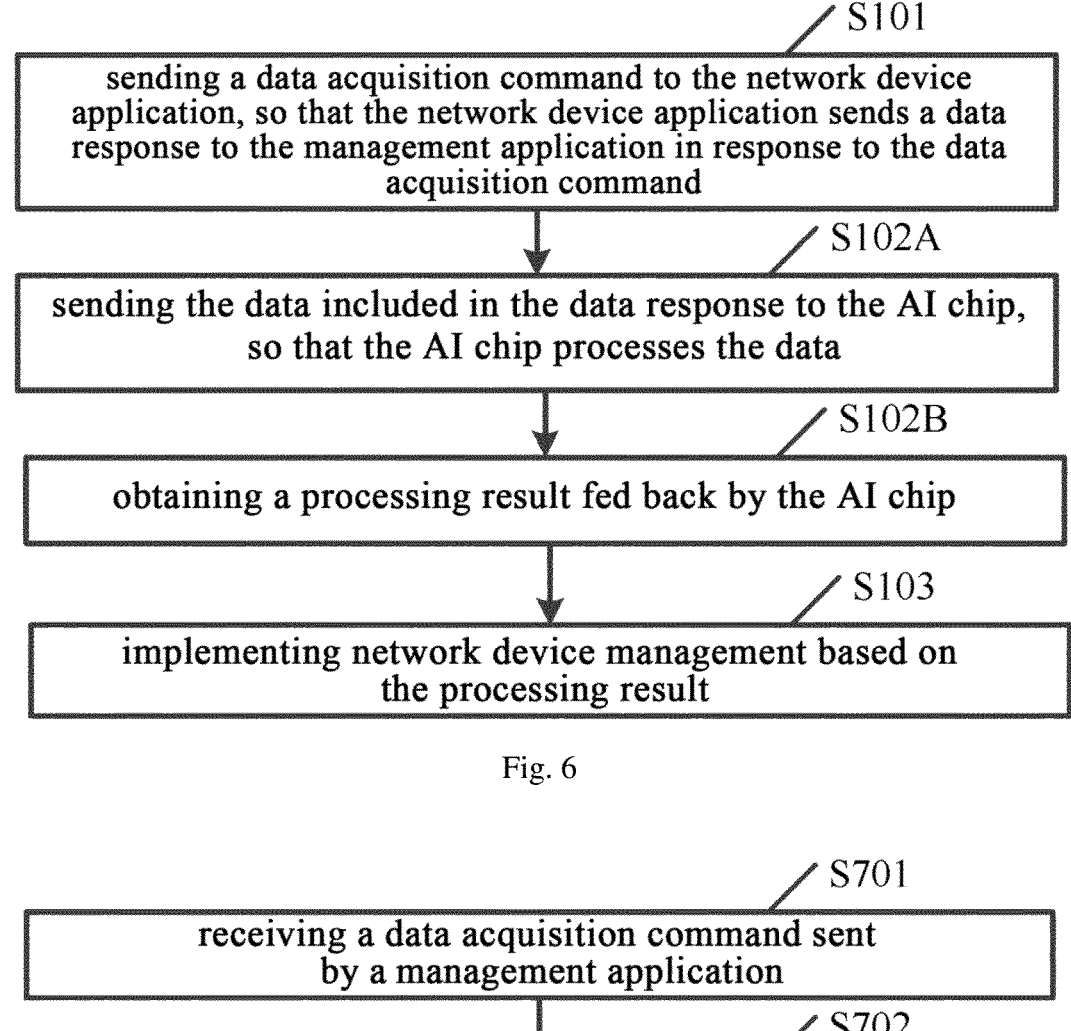

/ S101 sending a data acquisition command to the network device application, so that the network device application sends a data response to the management application in response to the data acquisition command

/ S102A sending the data included in the data response to the AI chip, so that the AI chip processes the data

/ S102B obtaining a processing result fed back by the AI chip

/ S103 implementing network device management based on the processing result

Fig. 6

/ S701 receiving a data acquisition command sent by a management application

/ S702 obtaining data requested by the data acquisition command

/ S703 sending a data response including the data to the management application, so that the management application processes the data included in the data response, and implements network device management based on a processing result

Fig. 7

METHOD, SYSTEM AND APPARATUS FOR NETWORK DEVICE MANAGEMENT

CROSS REFERENCE TO RELATED APPLICATION

The present application is a national phase application under 35 U.S.C. § 371 of International Application No. PCT/CN2022/079203, filed Mar. 4, 2022, the entire contents of which are incorporated herein by reference in their entirety.

TECHNICAL FIELD

The present disclosure relates to a field of network communication technology, and in particular, to a method, a system and an apparatus for network device management.

BACKGROUND

A network device, such as a switch and a router, will generate various data or have various faults during operation. Therefore, it is necessary to manage the network device, including analyzing the data generated by the network device to monitor the network device, or to troubleshoot the network device, all of which belong to the scope of network device management.

In the prior art, the network device may be managed by an analyzer. Specifically, the network device may send data to the analyzer, and the analyzer processes the received data, so as to complete the process of network device management such as monitoring and troubleshooting of the network device. However, if there are many network devices managed by the analyzer, each network device will send data to the analyzer, and the analyzer will receive a large amount of data, and the pressure of processing data by the analyzer will be too high, which will lead to low efficiency of network device management and make it difficult to ensure the timeliness of network device management.

SUMMARY

The purpose of examples of the present disclosure is to provide a method, a system and an apparatus for network device management, so as to improve the efficiency of network device management. Specifically, the technical solutions are as follows.

In a first aspect, an example of the present disclosure provides a network device management method, which is applied to a management application deployed on a network device, the management application is to manage the network device, a network device application is to realize a network communication function of the network device, the network device application and the management application run on a same processing chip in the network device, the method includes:

sending a data acquisition command to the network device application so that the network device application sends a data response to the management application in response to the data acquisition command, wherein the data response includes data requested by the data acquisition command;

processing the data included in the data response to obtain a processing result;

implementing network device management based on the processing result.

In an example of the present disclosure, the management application is deployed in a first container, and the managed network device application is deployed in a second container, and sending a data acquisition command to the managed network device application so that the network device application sends a data response to the management application in response to the data acquisition command includes:

sending a data acquisition command to the network device application through a virtual bridge between the first container and the second container based on an IP address of the second container, so that the network device application, in response to the data acquisition command, sends a data response to the management application through the virtual bridge based on an IP address of the first container.

In an example of the present disclosure, the management application is deployed in a first module, and the managed network device application is deployed in a second module, and sending a data acquisition command to the managed network device application so that the network device application sends a data response to the management application in response to the data acquisition command includes:

sending a data acquisition command to the network device application based on a local loopback address of the network device and a socket port number of the second module, so that the network device application, in response to the data acquisition command, sends a data response to the management application based on the local loopback address and a socket port number of the first module.

In an example of the present disclosure, the management application is an artificial intelligence AI application, and when the network device is configured with an AI chip, processing the data included in the data response to obtain a processing result includes:

sending the data included in the data response to the AI chip so that the AI chip processes the data;

obtaining a processing result fed back by the AI chip.

In an example of the present disclosure, sending the data included in the data response to the AI chip so that the AI chip processes the data includes:

sending the data to a target sub-chip included in the AI chip based on a type of an algorithm used by the management application, so that the target sub-chip processes the data, wherein the target sub-chip is a sub-chip matched with the type in the AI chip.

In a second aspect, an example of the present disclosure provides a network device management method, which is applied to a network device application deployed on a network device, wherein the network device is to realize a network communication function of the network device, the method includes:

receiving a data acquisition command sent by a management application, wherein the management application and the network device application run on a same processing chip in the network device, and the management application is to manage the network device application;

obtaining data requested by the data acquisition command;

sending a data response including the data to the management application so that the management application processes the data included in the data response, and implements network device management based on a processing result.

In an example of the present disclosure, the management application is deployed in a first container, and the network device application is deployed in a second container, and receiving a data acquisition command sent by a management application includes:

receiving a data acquisition command sent by the management application through a virtual bridge between the first container and the second container based on a IP address of the second container;

wherein sending a data response including the data to the management application includes:

sending a data response including the data to the management application through the virtual bridge based on a IP address of the first container.

In an example of the present disclosure, the management application is deployed in a first module, and the network device application is deployed in a second module, and receiving a data acquisition command sent by a management application includes:

receiving a data acquisition command sent by the management application based on a local loopback address of the network device and a socket port number of the second module;

wherein sending a data response including the data to the management application includes:

sending a data response including the data to the management application based on the local loopback address and a socket port number of the first module.

In a third aspect, an example of the present disclosure provides a network device management system including a management application and a network device application running on a same processing chip in a network device, wherein the management application is to manage the network device, the network device application is to realize a network communication function of the network device;

the management application is to send a data acquisition command to the network device application;

the network device application is to obtain data requested by the data acquisition command, and send a data response including the data to the management application;

the management application is further to process the data included in the data response to obtain a processing result, and implement network device management based on the processing result.

In an example of the present disclosure, the management application is deployed in a first container, and the managed network device application is deployed in a second container;

the management application is specifically to send a data acquisition command to the network device application through a virtual bridge between the first container and the second container based on an IP address of the second container;

the network device application is specifically to send a data response including the data to the management application through the virtual bridge based on an IP address of the first container.

In an example of the present disclosure, the management application is deployed in a first module, and the managed network device application is deployed in a second module;

the management application is specifically to send a data acquisition command to the network device application based on a local loopback address of the network device and a socket port number of the second module;

the network device application is specifically to send a data response including the data to the management application based on the local loopback address and a socket port number of the first module.

In an example of the present disclosure, the management application is an artificial intelligence AI application, and when the network device is configured with an AI chip, the management application is specifically to:

send the data included in the data response to the AI chip, so that the AI chip processes the data;

obtain a processing result fed back by the AI chip.

In an example of the present disclosure, the management application is specifically to:

send the data to a target sub-chip included in the AI chip based on a type of an algorithm used by the management application, so that the target sub-chip processes the data, wherein the target sub-chip is a sub-chip matched with the type in the AI chip.

In a fourth aspect, an example of the present disclosure provides a network device management apparatus, which is applied to a management application deployed on a network device, wherein the management application is to manage the network device, a network device application is to realize a network communication function of the network device, and the network device application and the management application run on a same processing chip in the network device, the apparatus includes:

a command sending module is to send a data acquisition command to the network device application, so that the network device application sends a data response to the management application in response to the data acquisition command, wherein the data response includes data requested by the data acquisition command;

a data processing module is to process the data included in the data response to obtain a processing result;

a network device management module is to implement network device management based on the processing result.

In a fifth aspect, an example of the present disclosure provides a network device management apparatus, which is applied to a network device application deployed on a network device, the network device application is to realize a network communication function of the network device, the apparatus includes:

a command receiving module is to receive a data acquisition command sent by a management application, wherein the management application and the network device application run on a same processing chip in the network device, and the management application is to manage the network device;

a data obtaining module is to obtain data requested by the data acquisition command;

a response sending module is to send a data response including the data to the management application, so that the management application processes the data included in the data response and implements network device management based on a processing result.

The examples of the present disclosure have the following beneficial effects:

In the example of the present disclosure, the management application deployed on the network device may send the data acquisition command to the network device application running on the same processing chip of the network device as the management application. The management application sends the data response including the data requested by the data acquisition command to the management application in response to the data acquisition command. After obtaining the requested data, the management application may process the data to obtain the processing result, and then manage the network device based on the processing result.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

BRIEF DESCRIPTION OF DRAWINGS

In order to more clearly describe the technical solutions of the examples of the present disclosure or of the prior art, drawings that need to be used in examples and the prior art will be briefly described below. Obviously, the drawings provided below are for only some examples of the present disclosure; those skilled in the art may also obtain other drawings based on these drawings.

FIG. 6 is a schematic flowchart of a fourth network device management method provided by an example of the present disclosure;

FIG. 7 is a schematic flowchart of a fifth network device management method provided by an example of the present disclosure;

DETAILED DESCRIPTION

In order to make the objectives, technical solutions, and advantages of the present disclosure clearer and more understandable, the present disclosure will be described in more detail below with reference to the appended drawings and examples. Obviously, the described examples are only some, and not all, of the examples of the present disclosure. All other examples obtained based on the examples of the present disclosure by those skilled in the art fall into the scope of protection defined by the present disclosure.

Due to the low efficiency of network device management in the prior art, in order to solve this problem, examples of the present disclosure provide a network device management method, a system and an apparatus.

The example of the present disclosure provides a network device management method, which is applied to a management application deployed on a network device, wherein the management application is to manage the network device, a network device application is to realize a network communication function of the network device, and the network device application and the management application run on the same processing chip in the network device, the method includes:

sending a data acquisition command to the network device application, so that the network device application sends a data response to the management application in response to the data acquisition command, wherein the data response includes data requested by the data acquisition command;

processing the data included in the data response to obtain a processing result;

implementing network device management based on the processing result.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

Figure 1:
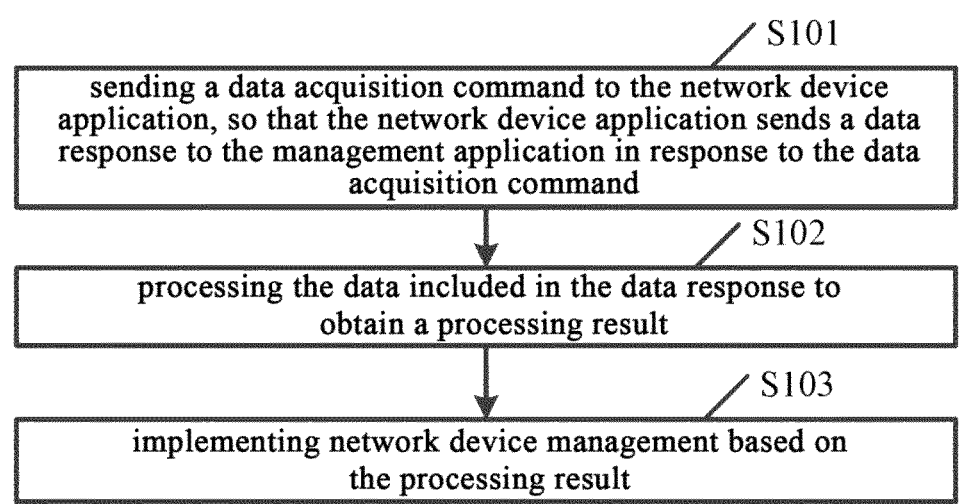
FIG. 1 is a schematic flowchart of a first network device management method provided by an example of the present disclosure.

Referring to FIG. 1, which is a schematic flowchart of a first network device management method provided by an example of the present disclosure, the first network device management method is applied to a management application configured on a network device, wherein the management application is to manage the network device, the network device application is to realize a network communication function of the network device, and the network device application and the management application run on the same processing chip in the network device. The method includes the following blocks S101-S103.

The network device may be a switch and a router, etc. The network device includes a processing chip capable of running applications and processing data. The management application and the network device application in this example both run on the same processing chip, such as CPU (Central Processing Unit), FPGA (Field Programmable Gate Array), DSP (Digital Signal Processing) chip or switching chip, etc.

S101: sending a data acquisition command to the network device application, so that the network device application sends a data response to the management application in response to the data acquisition command.

The data response includes data requested by the data acquisition command.

Specifically, the network device application may be any application running in the network device. For example, the network device application may be to realize functions such as message forwarding of the network device. The management application may send different data acquisition commands to the network device application based on requirements, so as to obtain different data from the network device application. The data may be data generated by the network device application during the operation and representing the operation state of the network device application. In this example, the data requested by the data acquisition command is not limited.

For example, if the management application is to monitor whether the network device application is in a fault state, the management application may send the data acquisition command to the network device application to obtain a running time of the network device application, a thread corresponding to the network device application, the amount of the processed data, etc., so as to complete the fault monitoring of the network device application.

In addition, the management application configured in the processing chip communicates with the managed network device application through a command-response architecture.

The management application may send a command to the network device application based on NETCONF (Network Configuration Protocol), and the response architecture may send a response to the management application based on RPC (Remote Procedure Call) protocol, so that a NETCONF-RPC architecture is formed between the management application and the network device application.

S102: processing the data included in the data response to obtain a processing result.

Specifically, the management application may process the data based on the corresponding management function, in which a variety of different codes may be encapsulated in the management application to realize different management functions for different network devices. When installing the management application in different network devices, different parameters may be set in the configuration file of the management application, such that the management application can adapt to different network devices.

For example, the management application may process the data to determine whether the network device application has a fault, and the processing result may be a fault determination result, or a fault adjustment parameter is to troubleshoot the network device application when it is determined that the network device application has a fault.

Alternatively, the management application may process the data to monitor the operation of the network device application, such as data processing speed, data flow, etc., and the processing result may also be a monitoring result.

S103: implementing network device management based on the processing result.

Specifically, the management application may record the processing result in the cache, so that the user may read the processing result later to manage the network device.

Also, if the process of the network device management involves adjusting the network device application, the management application may also send a management command including the processing result to the network device application, so that the network device application adjusts itself in response to the management command, thereby implementing network device management.

Specifically, the network device application may stop or suspend its operation after receiving the management command. For example, if the processing result is that the network device application is monitored to have a fault, the network device application may stop or suspend its operation after receiving the management command.

Alternatively, the network device application may adjust its own operation parameters after receiving the management command, so as to adjust its own operation state and complete the process of the network device management. Then the processing result is the operation parameter to which the network device application will be adjusted. For example, the operation parameters may be data processing speed, application interface parameters, etc.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

In an example of the present disclosure, the management application is deployed in a first container, and the managed network device application is deployed in a second container, the first container and the second container being virtual environments for running the management application and the network device application respectively. Operating systems configured in the first container and the second container may be different from each other, so that the management application and the network device application may run in different operating systems.

The first container and the second container are respectively assigned different IP addresses and socket port numbers. According to the IP addresses and the socket port numbers, the first container and the second container may complete the process of mutual transmission of the data acquisition command and the data response between the management application in the first container and the network device application in the second container based on NETCONF and RPC of the application layer and by calling the socket of the abstraction layer, so as to realize IPC (Inter-Process Communication) between the management application and the network device application.

Figure 2:
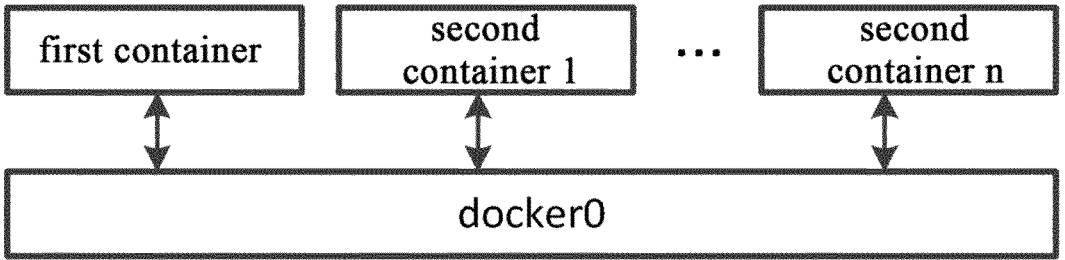
FIG. 2 is a schematic diagram of a connection relationship between containers provided by an example of the present disclosure.

Referring to FIG. 2, which is a schematic diagram of a connection relationship between containers provided by an example of the present disclosure.

The management application is deployed in the first container included in FIG. 2, and network device application 1 to network device application n are deployed in second container 1 to second container n respectively. The first container and the second containers are connected to the virtual bridge docker0. After each container is connected to docker0, it will be assigned an IP address. For example, the IP address of the first container is 172.17.0.2, the IP address of the second container 1 is 172.17.0.3, the IP address of the second container 2 is 172.17.0.4 and the like, and the IP address of docker0 is 172.17.0.1/16. The first container, the second container 1 and the second container 2 are assigned different socket port numbers. The containers may communicate with each other based on their IP addresses and socket port numbers.

Figure 3:
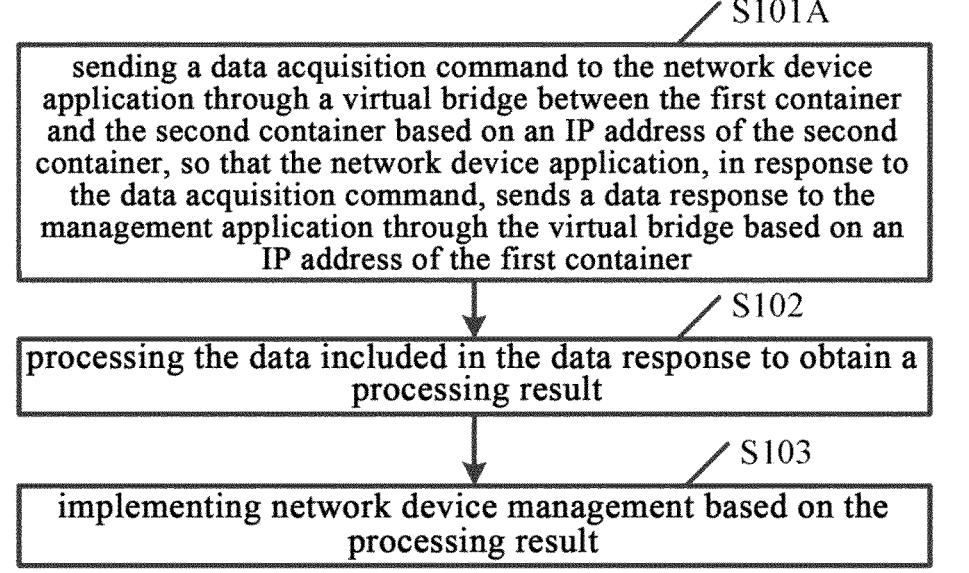
FIG. 3 is a schematic flowchart of a second network device management method provided by an example of the present disclosure.

Based on the first container and the second containers, referring to FIG. 3, which is a schematic flowchart of a second network device management method provided by an example of the present disclosure. Compared with the example shown in FIG. 1, the above block S101 may be implemented by the following block S101A.

S101A: sending a data acquisition command to the network device application through a virtual bridge between the first container and the second container based on the IP address of the second container, so that the network device application, in response to the data acquisition command, sends a data response to the management application through the virtual bridge based on the IP address of the first container.

Specifically, the management application may send the data acquisition command to the second container with the IP address of the second container where the network device application is located as a destination address and the IP address of the first container where the management application is located as a source address, which is equivalent to sending the data acquisition command to the network device application deployed in the second container.

In response to the data acquisition command, the network device application may send the data response to the first container in reverse with the IP address of the first container where the management application is located as a destination address and the IP address of the second container where the network device application is located as a source, which is equivalent to sending the data response to the management application deployed in the first container.

It can be seen from the above that the management application and the network device application are deployed in the first container and the second container respectively. The management application and the network device application may complete the transmission of the data acquisition command and the data response between each other through the IP addresses of the first container and the second container, so as to complete the process of network device management.

In another example of the present disclosure, the management application is deployed in a first module, and the managed network device application is deployed in a second module, wherein, unlike the above container, the management application and the network device application being deployed in modules is equivalent to the management application and the network device application themselves being software modules or components. The management application and the network device application run in the same operating system.

The first module and the second module are respectively assigned different socket port numbers. According to the assigned socket port numbers and local loopback addresses of the network device, the first module and the second module may complete the process of mutual transmission of the data acquisition command and the data response between the management application in the first module and the network device application in the second module based on NETCONF and RPC of the application layer and by calling the socket of the abstraction layer. IPC between the management application and the network device application are realized.

Figure 4:
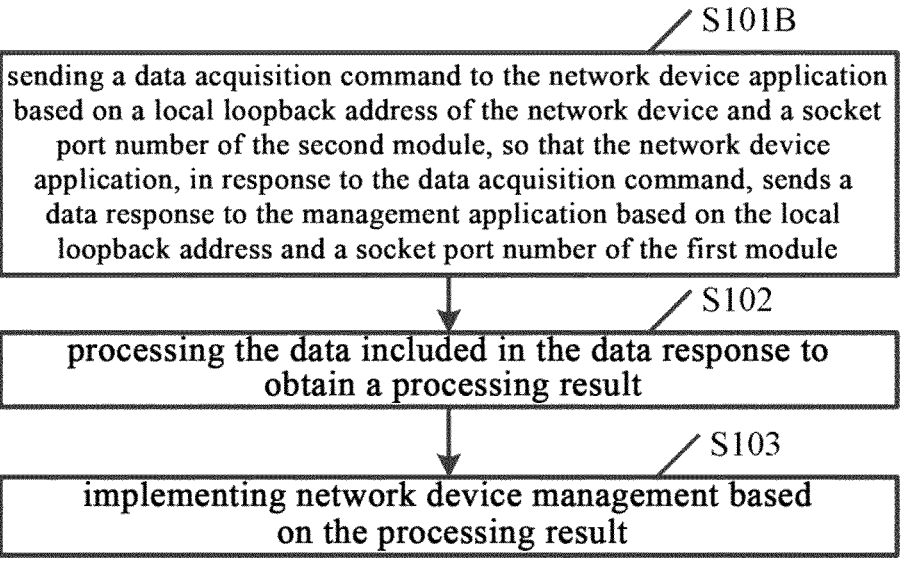
FIG. 4 is a schematic flowchart of a third network device management method provided by an example of the present disclosure.

Referring to FIG. 4, which is a schematic flowchart of a third network device management method provided by an example of the present disclosure. Compared with the example shown in FIG. 1, the block S101 may be implemented by the following block S101B.

S101B: sending a data acquisition command to the network device application based on the local loopback address of the network device and the socket port number of the second module, so that the network device application, in response to the data acquisition command, sends a data response to the management application based on the local loopback address and the socket port number of the first module.

Specifically, the management application and the network device application are deployed in the first module and the second module respectively, and run in parallel as different processes, then management application and the network device application encapsulate the data acquisition command and the data response in a preset IPC format by means of IPC, so as to transmit the data acquisition command and the data response to each other.

The first module and the second module may be assigned respectively different socket port numbers. The management application and the network device application may communicate with each other based on the local loopback address and the socket port numbers.

It can be seen from the above that the management application and the network device application are deployed in the first module and the second module respectively. The management application and the network device application may complete the transmission of the data acquisition command and the data response between each other through the local loopback address and the socket port numbers of the first module and the second module, so as to complete the process of network device management.

In another example of the present disclosure, the management application is an AI (Artificial Intelligence) application, and the network device is configured with an AI chip.

The AI application is an application that uses a machine learning algorithm to implement network device management. For example, the machine learning algorithm may be a deep learning algorithm, a neural network model, etc.

In addition, the AI chip is a system composed of many different sub-chips, which is suitable for running AI application and can perform fast and high-density calculation on big data. For example, the AI chip may include sub-chips such as CPU, SDRAM (Synchronous Dynamic Random-Access Memory) and NP (Neural Networking Processor), the SDRAM may be DDR SDRAM (Double Data Rate Synchronous Dynamic Random-Access Memory).

Figure 5:
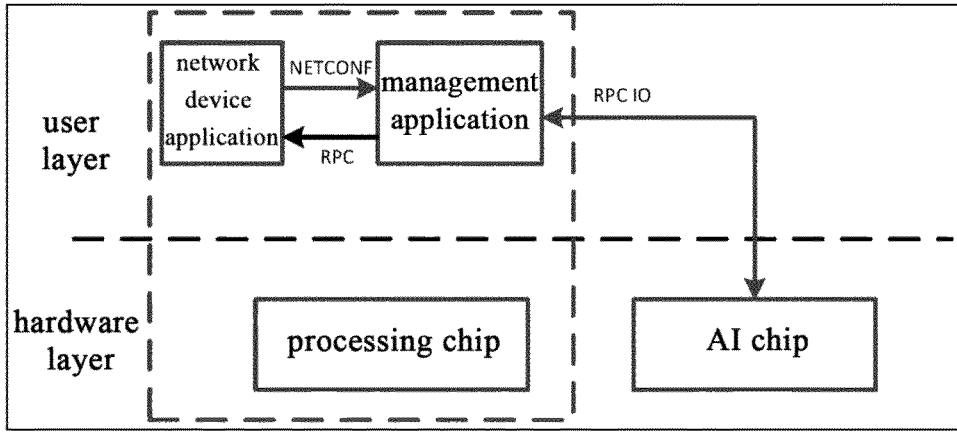
FIG. 5 is a schematic diagram of a hierarchical structure of a network device provided by an example of the present disclosure.

Referring to FIG. 5, which is a schematic diagram of a hierarchical structure of a network device provided by an example of the present disclosure.

As can be seen from the figure, the user layer of the network device includes the management application and the network device application, and the hardware layer includes the processing chip and the AI chip. The dotted box in the figure indicates that the management application and the network device application run on the processing chip. The management application sends the data acquisition command to the network device application based on NETCONF, and the network device application feeds back the data response to the management device based on RPC. The arrow between the management application and the AI chip indicates that when the management application is an AI application, the management application may communicate with the AI chip through RPC IO (Input/Output) interface provided by the AI chip, and the AI application may quickly process a large amount of data with the help of the computing power of the AI chip.

In the foregoing case, referring to FIG. 6, which is a schematic flowchart of a fourth network device management method provided by an example of the present disclosure. Compared with the example shown in FIG. 1, the block S102 may be implemented by the following blocks S102A-S102B.

S102A: sending the data included in the data response to the AI chip, so that the AI chip processes the data.

Specifically, the management application may send the data to the AI chip based on the RPC IO provided by the AI chip, and the AI chip may process the data. After the data processing is finished, the AI chip may feed back a processing result to the management application based on the RPC IO, so that the management application may obtain the processing result.

In an example of the present disclosure, since the AI chip is a system composed of multiple different sub-chips, different sub-chips have different functions and are suitable for running different algorithms, in order to give full play to the data processing ability of the AI chip, the block S102A may be implemented through the following block A.

Block A: sending the data to a target sub-chip included in the AI chip based on a type of an algorithm used by the management application, so that the target sub-chip processes the data.

The target sub-chip is a sub-chip matched with the type of the algorithm in the AI chip.

Specifically, NP chip included in the AI chip is suitable for completing the process of the data processing of deep learning algorithm, and CPU chip included in the AI chip is suitable for completing the process of the data processing of machine learning algorithms such as holt-winters algorithm, random forest algorithm, skyline algorithm.

When the algorithm applicable to the management application is a deep learning algorithm, the target sub-chip is an NP chip; and when the algorithm applicable to the management application is other machine learning algorithm except the deep learning algorithm, the target sub-chip is a CPU chip.

S102B: obtaining a processing result fed back by the AI chip.

The AI chip may send the processing result to the management application through the RPC IO, so that the management application may obtain the processing result fed back by the AI chip.

It can be seen from the above that when the management application is an AI application and the network device is configured with an AI chip, the management application may send the data to the AI chip which has strong computing power and is suitable for data processing of AI algorithm. The process of the data processing is completed by the AI chip, rather than directly by the processing chip where the management application is located. Therefore, it may save the data processing resources of the processing chip where the management application is located, and make full use of the data processing resources of the AI chip to complete the process of network device management with high efficiency.

Corresponding to the above network device management method applied to a management application, an example of the present disclosure also provides a network device management method applied to the managed network device application.

Referring to FIG. 7, which is a schematic flowchart of a fifth network device management method provided by an example of the present disclosure. The method includes the following blocks S701-S703.

S701: receiving a data acquisition command sent by a management application.

The management application and the network device application run on the same processing chip in the network device. The management application is to manage the network device application.

S702: obtaining data requested by the data acquisition command.

S703: sending a data response including the data to the management application, so that the management application processes the data included in the data response, and implements network device management based on a processing result.

Specifically, the blocks S701-S703 are similar to the blocks S101-S103 shown in FIG. 1, and the specific examples may refer to the contents shown above and will not be described in detail here.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

In an example of the present disclosure, the block S701 may be implemented by the following block B.

Block B: receiving a data acquisition command sent by the management application through the virtual bridge between the first container and the second container based on the IP address of the second container.

In addition, the data response may be sent to the management application through the following block C.

Block C: sending a data response including the data to the management application through the virtual bridge based on the IP address of the first container.

Specifically, the blocks B-C are similar to the block S101A shown in FIG. 2. The specific example may refer to the contents shown above and will not be described in detail here.

It can be seen from the above that the management application and the network device application are deployed in the first container and the second container respectively. The management application and the network device application may complete the transmission of the data acquisition command and the data response between each other through the IP addresses of the first container and the second container, so as to complete the process of network device management.

In an example of the present disclosure, the block S701 may be implemented by the following block D.

Block D: receiving a data acquisition command sent by the management application based on the local loopback address of the network device and the socket port number of the second module.

In addition, the data response may be sent to the management application through the following block E.

Block E: sending a data response including the data to the management application based on the local loopback address and the socket port number of the first module.

Specifically, the blocks D-E are similar to the block S101B shown in FIG. 3. The specific example may refer to the contents shown above and will not be described in detail here.

It can be seen from the above that the management application and the network device application are deployed in the first module and the second module respectively. The management application and the network device application may complete the transmission of the data acquisition command and the data response between each other through the local loopback address and the socket port numbers of the first module and the second module, so as to complete the process of network device management.

Corresponding to the above network device management method applied to a management application and the above network device management method applied to a network device application, an example of the present disclosure also provides a network device management system. The system includes a management application and a network device application running on the same processing chip in a network device. The management application is to manage the network device, and the network device application is to realize the network communication function of the network device.

Figures 8, 9, 10:
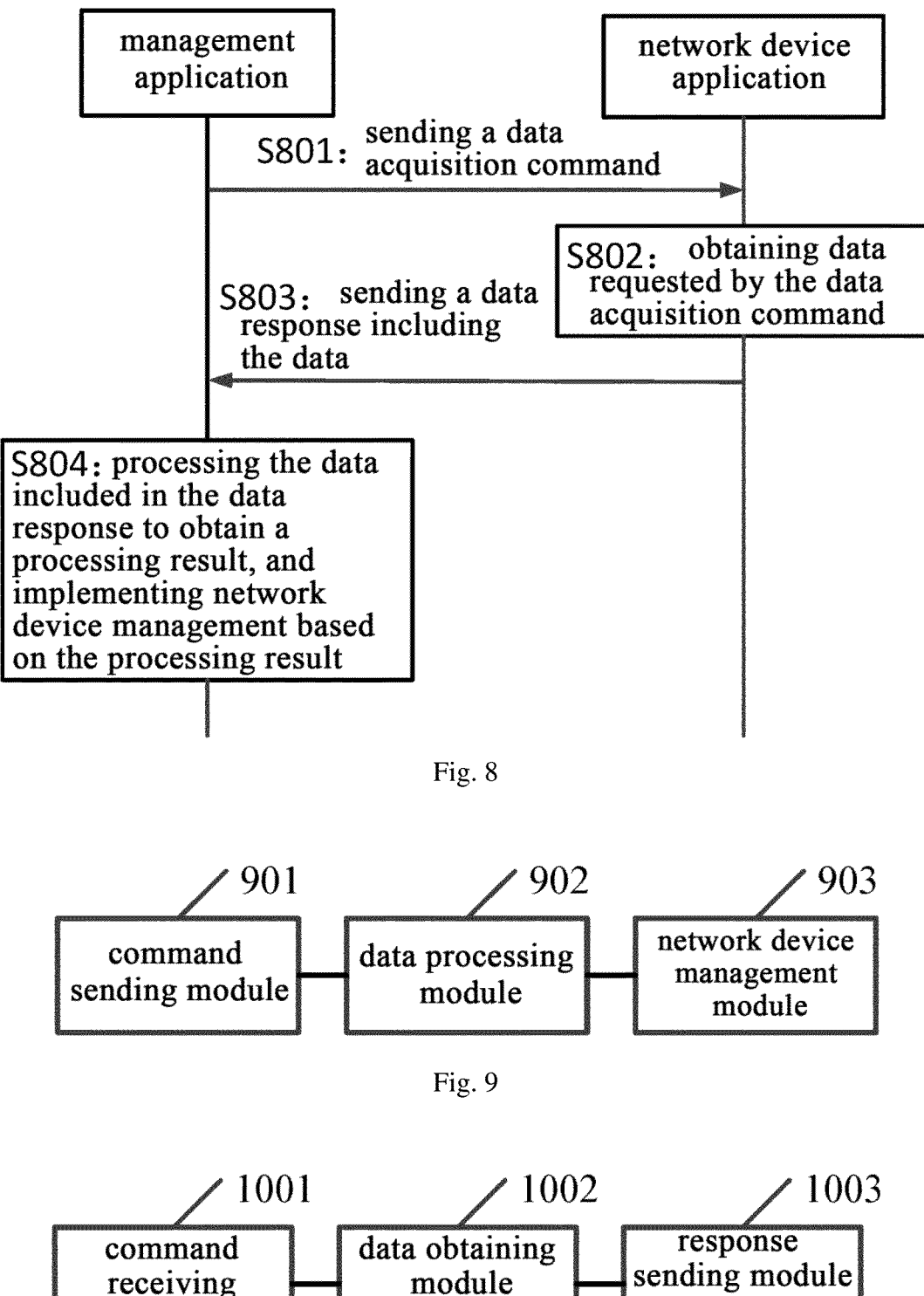
FIG. 8 is a schematic flowchart of a sixth network device management method provided by an example of the present disclosure.
FIG. 9 is a schematic structural diagram of a network device management apparatus provided by an example of the present disclosure.
FIG. 10 is a structural schematic diagram of a network device management apparatus provided by an example of the present disclosure.

Referring to FIG. 8, which is a schematic flowchart of a sixth network device management method provided by an example of the present disclosure. The method includes the following blocks S801-S804.

S801: the management application sends a data acquisition command to the network device application.

S802: the network device application obtains data requested by the data acquisition command.

S803: the network device application sends a data response including the data to the management application.

S804: the management application processes the data included in the data response to obtain a processing result, and implements network device management based on the processing result.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

In an example of the present disclosure, the management application is deployed in a first container, and the managed network device application is deployed in a second container;

the block S801 may be implemented by the following block F.

Block F: the management application sends a data acquisition command to the network device application through a virtual bridge between the first container and the second container based on an IP address of the second container.

The block S803 may be implemented by the following block G.

Block G: the network device application sends a data response including the data to the management application through the virtual bridge based on an IP address of the first container.

It can be seen from the above that the management application and the network device application are deployed in the first container and the second container respectively. The management application and the network device application may complete the transmission of the data acquisition command and the data response between each other through the IP addresses of the first container and the second container, so as to complete the process of network device management.

In an example of the present disclosure, the management application is deployed in the first module, and the managed network device application is deployed in the second module;

the block S801 may be implemented by the following block H.

Block H: the management application sends a data acquisition command to the network device application based on a local loopback address of the network device and a socket port number of the second module.

The block S803 may be implemented by the following block I.

Block I: the network device application sends a data response including the data to the management application based on the local loopback address and the socket port number of the first module.

It can be seen from the above that the management application and the network device application are deployed in the first module and the second module respectively. The management application and the network device application may complete the transmission of the data acquisition command and the data response between each other through the local loopback address and the socket port numbers of the first module and the second module, so as to complete the process of network device management.

In an example of the present disclosure, the management application is an AI application. When the network device is configured with an AI chip, the block S804 may be implemented by the following blocks J-K.

Block J: the management application sends the data included in the data response to the AI chip, so that the AI chip processes the data.

Block K: obtaining a processing result fed back by the AI chip, and implementing the network device management based on the processing result.

It can be seen from the above that when the management application is an AI application and the network device is configured with an AI chip, the management application may send the data to the AI chip which has strong computing power and is suitable for data processing of AI algorithm. The process of the data processing is completed by the AI chip, rather than directly by the processing chip where the management application is located. Therefore, it may save the data processing resources of the processing chip where the management application is located, and make full use of the data processing resources of the AI chip to complete the process of network device management with high efficiency.

In an example of the present disclosure, the block J may be implemented by the following block J1.

Block J1: the management application sends the data to a target sub-chip included in the AI chip based on a type of an algorithm used by the management application, so that the target sub-chip processes the data.

The target sub-chip is a sub-chip matched with the type in the AI chip.

Corresponding to the above network device management method applied to a management application, an example of the present disclosure also provides a network device management apparatus applied to the management application.

Referring to FIG. 9, which is a schematic structural diagram of a network device management apparatus provided by an example of the present disclosure, the network device management apparatus is applied to a management application deployed on a network device, wherein a management application is to manage the network device, and a network device application is to realize a network communication function of the network device. The network device application and the management application both run on the same processing chip in the network device. The apparatus includes:

a command sending module 901 is to send a data acquisition command to the network device application, so that the network device application sends a data response to the management application in response to the data acquisition command, wherein the data response includes: data requested by the data acquisition command;

a data processing module 902 is to process the data included in the data response to obtain a processing result;

a network device management module 903 is to implement network device management based on the processing result.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

In an example of the present disclosure, the management application is deployed in a first container, and the managed network device application is deployed in a second container, and the command sending module 901 is specifically to:

send a data acquisition command to the network device application through a virtual bridge between the first container and the second container based on an IP address of the second container, so that the network device application, in response to the data acquisition command, sends a data response to the management application through the virtual bridge based on an IP address of the first container.

It can be seen from the above that the management application and the network device application are deployed in the first container and the second container respectively. The management application and the network device application may complete the transmission of the data acquisition command and the data response between each other through the IP addresses of the first container and the second container, so as to complete the process of network device management.

In an example of the present disclosure, the management application is deployed in a first module, and the managed network device application is deployed in a second module, and the command sending module 901 is specifically to:

send a data acquisition command to the network device application based on an local loopback address of the network device and a socket port number of the second module, so that the network device, in response to the data acquisition command, sends a data response to the management application based on the local loopback address and a socket port number of the first module.

It can be seen from the above that the management application and the network device application are deployed in the first module and the second module respectively. The management application and the network device application may complete the transmission of the data acquisition command and the data response between each other through the local loopback address and the socket port numbers of the first module and the second module, so as to complete the process of network device management.

In an example of the present disclosure, the management application is an artificial intelligence AI application. When the network device is configured with an AI chip, the data processing module 902 includes:

a data sending sub-module is to send the data included in the data response to the AI chip, so that the AI chip processes the data;

a data obtaining sub-module is to obtain a processing result fed back by the AI chip.

It can be seen from the above that when the management application is an AI application and the network device is configured with an AI chip, the management application may send the data to the AI chip which has strong computing power and is suitable for data processing of AI algorithm. The process of the data processing is completed by the AI chip, rather than directly by the processing chip where the management application is located. Therefore, it may save the data processing resources of the processing chip where the management application is located, and make full use of the data processing resources of the AI chip to complete the process of network device management with high efficiency.

In an example of the present disclosure, the data sending sub-module is specifically to:

send the data to a target sub-chip included in the AI chip based on a type of an algorithm used by the management application, so that the target sub-chip processes the data, wherein the target sub-chip is a sub-chip matched with the type in the AI chip.

Corresponding to the above network device management method applied to a network device application, an example of the present disclosure also provides a network device management apparatus applied to the network device application.

Referring to FIG. 10, which is a schematic structural diagram of a network device management apparatus provided by an example of the present disclosure, the network device management apparatus is applied to a network device application deployed on a network device, wherein the network device application is to realize a network communication function of the network device. The apparatus includes:

a command receiving module 1001 is to receive a data acquisition command sent by a management application, wherein the management application and the network device application run on the same processing chip in the network device, and the management application is to manage the network device;

a data obtaining module 1002 is to obtain data requested by the data acquisition command;

a response sending module 1003 is to send a data response including the data to the management application, so that the management application processes the data included in the data response and implements network device management based on a processing result.

It can be seen from the above that the management application for managing the network device application and the network device application are both configured on the same processing chip of the network device. Since the operation of the network device is implemented based on the configured network device application, managing the network device application configured in the network device is equivalent to managing the network device, That is, in the example of the present disclosure, the network device may manage itself, does not need a third-party analyzer to implement network device management, and makes full use of its own computing resources, so as to improve the efficiency of network device management.

In an example of the present disclosure, the management application is deployed in a first container, and the managed network device application is deployed in a second container. The command receiving module 1001 is specifically to:

receive a data acquisition command sent by the management application through a virtual bridge between the first container and the second container based on an IP address of the second container.

The response sending module 1003 is specifically to:

send a data response including the data to the management application through the virtual bridge based on an IP address of the first container, so that the management application processes the data included in the data response, and implements network device management based on a processing result.

It can be seen from the above that the management application and the network device application are deployed in the first container and the second container respectively. The management application and the network device application may complete the transmission of the data acquisition command and the data response between each other through the IP addresses of the first container and the second container, so as to complete the process of network device management.

In an example of the present disclosure, the management application is deployed in a first module, and the network device application is deployed in the second module, and the command receiving module 1001 is specifically to:

receive a data acquisition command sent by the management application based on a local loopback address of the network device and a socket port number of the second module.

The response sending module 1003 is specifically to:

send a data response including the data to the management application based on the local loopback address and a socket port number of the first module, so that the management application processes the data included in the data response and implements network device management based on a processing result.

It can be seen from the above that the management application and the network device application are deployed in the first module and the second module respectively. The management application and the network device application may complete the transmission of the data acquisition command and the data response between each other through the local loopback address and the socket port numbers of the first module and the second module, so as to complete the process of network device management.

It should be noted that the relationship terms use here, such as "first", "second" and the like are only to distinguish one entity or operation from another entity or operation, but do not necessarily require or imply that there is actual relationship or order between these entities or operations. Moreover, the terms "include", "comprise" or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or devices, including the listed elements.

All of the examples in the description are described in a correlated manner, and identical or similar parts in various examples may refer to one another. The description for each example focuses on the differences from other examples. In particular, the examples of systems and apparatuses are described briefly, since they are substantially similar to the example of methods, and the related contents may refer to the description of the examples of methods.

The examples described above are only preferred examples of the present disclosure, and are not intended to limit the scope of protection of the present disclosure. Any modifications, equivalent replacement, improvement made within the spirit and principle of the present disclosure shall be included in the scope of protection of the present disclosure.

What is claimed is:

1. A network device management method, which is applied to a management application deployed on a network device, wherein the management application is to manage the network device, a network device application is to realize a network communication function of the network device, and the network device application and the management application run on a same processing chip in the network device, the method comprises:

sending a data acquisition command to the network device application so that the network device application sends a data response to the management application in response to the data acquisition command, wherein the data response includes data requested by the data acquisition command;

processing the data included in the data response to obtain a processing result;

implementing network device management based on the processing result, wherein the management application is deployed in a first container, the managed network device application is deployed in a second container, and sending the data acquisition command to the managed network device application so that the network device application sends the data response to the management application in response to the data acquisition command comprises:

sending the data acquisition command to the network device application through a virtual bridge between the first container and the second container based on an IP address of the second container, so that the network device application, in response to the data acquisition command, sends the data response to the management application through the virtual bridge based on an IP address of the first container, or wherein the management application is deployed in a first module, the managed network device application is deployed in a second module, and sending the data acquisition command to the managed network device application so that the network device application sends the data response to the management application in response to the data acquisition command comprises:

sending the data acquisition command to the network device application based on a local loopback address of the network device and a socket port number of the second module, so that the network device application, in response to the data acquisition command, sends the data response to the management application based on the local loopback address and a socket port number of the first module.

2. The method according to claim 1, wherein the management application is an artificial intelligence AI application, and when the network device is configured with an AI chip, processing the data included in the data response to obtain the processing result comprises:

sending the data included in the data response to the AI chip so that the AI chip processes the data;

obtaining the processing result fed back by the AI chip.

3. The method according to claim 2, wherein sending the data included in the data response to the AI chip so that the AI chip processes the data comprises:

sending the data to a target sub-chip included in the AI chip based on a type of an algorithm used by the management application, so that the target sub-chip processes the data, wherein the target sub-chip is a sub-chip matched with the type in the AI chip.

4. A network device management method, which is applied to a network device application deployed on a network device, wherein the network device application is to realize a network communication function of the network device, the method comprises:

receiving a data acquisition command sent by a management application, wherein the management application and the network device application run on a same processing chip in the network device, and the management application is to manage the network device;

obtaining data requested by the data acquisition command;

sending a data response including the data to the management application, so that the management application processes the data included in the data response, and implements network device management based on a processing result, wherein the management application is deployed in a first container, the network device application is deployed in a second container, and receiving the data acquisition command sent by the management application comprises:

receiving the data acquisition command sent by the management application through a virtual bridge between the first container and the second container based on an IP address of the second container;

wherein sending the data response including the data to the management application comprises:

sending the data response including the data to the management application through the virtual bridge based on an IP address of the first container, or wherein the management application is deployed in a first module, the network device application is deployed in a second module, and receiving the data acquisition command sent by the management application comprises:

receiving the data acquisition command sent by the management application based on a local loopback address of the network device and a socket port number of the second module;

wherein sending the data response including the data to the management application comprises:

sending the data response including the data to the management application based on the local loopback address and a socket port number of the first module.

5. A network device management system comprising a management application and a network device application running on a same processing chip in a network device, wherein the management application is to manage the network device, the network device application is to realize a network communication function of the network device;

the management application is to send a data acquisition command to the network device application;

the network device application is to obtain data requested by the data acquisition command, and send a data response including the data to the management application;

the management application is further to process the data included in the data response to obtain a processing result, and implement network device management based on the processing result, wherein the management application is deployed in a first container, and the managed network device application is deployed in a second container;

the management application is specifically to send the data acquisition command to the network device application through a virtual bridge between the first container and the second container based on an IP address of the second container;

the network device application is specifically to send the data response including the data to the management application through the virtual bridge based on an IP address of the first container, or wherein the management application is deployed in a first module, and the managed network device application is deployed in a second module;

the management application is specifically to send the data acquisition command to the network device application based on a local loopback address of the network device and a socket port number of the second module;

the network device application is specifically to send the data response including the data to the management application based on the local loopback address and a socket port number of the first module.

6. The system according to claim 5, wherein the management application is an artificial intelligence AI application, and when the network device is configured with an AI chip, the management application is specifically to:

send the data included in the data response to the AI chip, so that the AI chip processes the data;

obtain the processing result fed back by the AI chip.

7. The system according to claim 6, wherein the management application is specifically to:

send the data to a target sub-chip included in the AI chip based on a type of an algorithm used by the management application, so that the target sub-chip processes the data, wherein the target sub-chip is a sub-chip matched with the type in the AI chip.

8. The method according to claim 1, wherein the management application is an artificial intelligence AI application, and when the network device is configured with an AI chip, processing the data included in the data response to obtain the processing result comprises:

sending the data included in the data response to the AI chip so that the AI chip processes the data;

obtaining the processing result fed back by the AI chip.

9. The system according to claim 5, wherein the management application is an artificial intelligence AI application, and when the network device is configured with an AI chip, the management application is specifically to:

send the data included in the data response to the AI chip, so that the AI chip processes the data;

obtain the processing result fed back by the AI chip.

\*    \*    \*    \*    \*